US012768724B2

(12) United States Patent
Malone

(10) Patent No.: US 12,768,724 B2
(45) Date of Patent: Oct. 20, 2026

(54) NON-INVASIVE TEMPERATURE MEASURING DEVICE

(71) Applicant: Cooper-Standard Automotive Inc., Northville, MI (US)

(72) Inventor: David S. Malone, Attica, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 294 days.

(21) Appl. No.: 18/400,005

(22) Filed: Dec. 29, 2023

(65) Prior Publication Data

US 2025/0216270 A1 Jul. 3, 2025

(51) Int. Cl.
*G01K 1/143* (2021.01)
*G01K 13/02* (2021.01)

(52) U.S. Cl.
CPC ............. *G01K 1/143* (2013.01); *G01K 13/02* (2013.01)

(58) Field of Classification Search
CPC ............................... G01K 1/143; G01K 13/02
USPC .................................................. 374/208, 147
See application file for complete search history.

(56) References Cited

U.S. PATENT DOCUMENTS 8,177,425 B2 5/2012 Grundmann et al.
2001/0053172 A1* 12/2001 Sakowsky ............. G01K 1/143 374/E1.019
2009/0135882 A1* 5/2009 Kloiber ................ G01D 11/245 374/185
2010/0111135 A1* 5/2010 Faries, Jr. .............. G01K 1/143 374/E1.018
2022/0260432 A1* 8/2022 Leibig ...................... G01K 1/18
2022/0283038 A1 9/2022 Pradun et al.

FOREIGN PATENT DOCUMENTS

FR 3057664 A1 * 4/2018 ............. G01K 1/143

* cited by examiner

*Primary Examiner* — Mirellys Jagan

(74) *Attorney, Agent, or Firm* — Paschall & Associates, LLC; James C. Paschall; Anthony Miologos

(57) ABSTRACT

A temperature measuring device for measuring the temperature of a fluid in a pipeline includes a clamping body having a probe receptacle extending from a first body portion of the clamping body. A temperature measuring probe is installed in the probe receptacle with a sensor capsule located in a protrusion extending from the first body portion. A second body portion of the clamping body is rotatably mounted to the first body portion. The first body portion is installed on a wall section of the pipeline after the wall section has been heated. The second body portion is then rotated to engage the first body portion and drive the protrusion to contact the heated wall section and cause the wall section to dilate and locate the dilated wall and the protrusion in the pipeline passage where the sensor capsule measures the temperature of the dilated wall.

20 Claims, 7 Drawing Sheets

NON-INVASIVE TEMPERATURE MEASURING DEVICE

TECHNICAL FIELD

This disclosure is generally directed to an apparatus and a method for assembling a non-invasive temperature measuring device to a tubing or pipeline wall to derive the temperature of a fluid flowing within the tube or pipeline.

BACKGROUND

Currently, there are few accurate solutions known for measuring the temperature of the outer wall of a tube or pipeline in order to measure the temperature of a fluid flowing in the tube or pipeline. This approach of measuring the outer wall is considered non-invasive because it does not require any aperture or port to be defined in the tube or pipeline wall and therefore, such non-intrusive approaches can be deployed at virtually any location along the tubing or pipeline. One known methodology for doing so is using clamping type device, which snaps on, or clips over, the exterior wall of a tube or pipeline. These devices suffer from issues of low accuracy due to poor heat transfer between tube or pipeline outer wall and the temperature-measuring element mounted to the device. Other implementations that clamp a heat sensitive element to a tube or pipe also suffer from difficult installations and/or poor temperature sensitivity. Such as for example, poor temperature accuracy due to low heat transfer and thermal losses induced by the absorption of heat into the surrounding tubing or pipeline wall where the heat sensitive element is mounted.

SUMMARY

This disclosure relates to an apparatus and a method for assembling a temperature measuring device to a tubing or pipeline wall to derive the temperature of a fluid within the tube or pipeline.

In a first embodiment an apparatus for measuring the temperature of a fluid contained in a passage enclosed by a wall is disclosed. The apparatus is comprised of a clamping body configured to attach to the wall and a protrusion arranged to cause a depression in the wall that dilates the wall and locates the protrusion within the passage when the clamping body is attached to the wall. A sensor capsule housed in the protrusion measures the temperature of the dilated wall.

In a second embodiment a method for assembling an apparatus that measures the temperature of a fluid contained in a passage enclosed by a wall is disclosed. The method comprises engaging a clamping body to the wall and causing a depression in the wall using a protrusion attached to the clamping body that dilates the wall and locates the protrusion within the passage. The method further includes installing a sensor capsule in the protrusion that measures the temperature of the dilated wall.

In a third embodiment a non-invasive temperature measuring device for measuring the temperature of a fluid in a pipeline passage enclosed by a wall is disclosed. The temperature measuring device comprises a clamping body having a probe receptacle extending from a first portion of the clamping body and a temperature measuring probe installed in the probe receptacle. The temperature measuring probe includes a sensor capsule located in a protrusion that extends from the first portion of the clamping body. A second portion of the clamping body is rotatably mounted to the first portion. The first portion of the clamping body is installed on a wall section of the pipeline after the wall section has been heated. The second portion of the clamping body is then rotated to engage the first portion and drive the protrusion to contact the heated wall section and cause the wall section to dilate and locate the dilated wall and the protrusion in the pipeline passage where the sensor capsule measures the temperature of the dilated wall.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
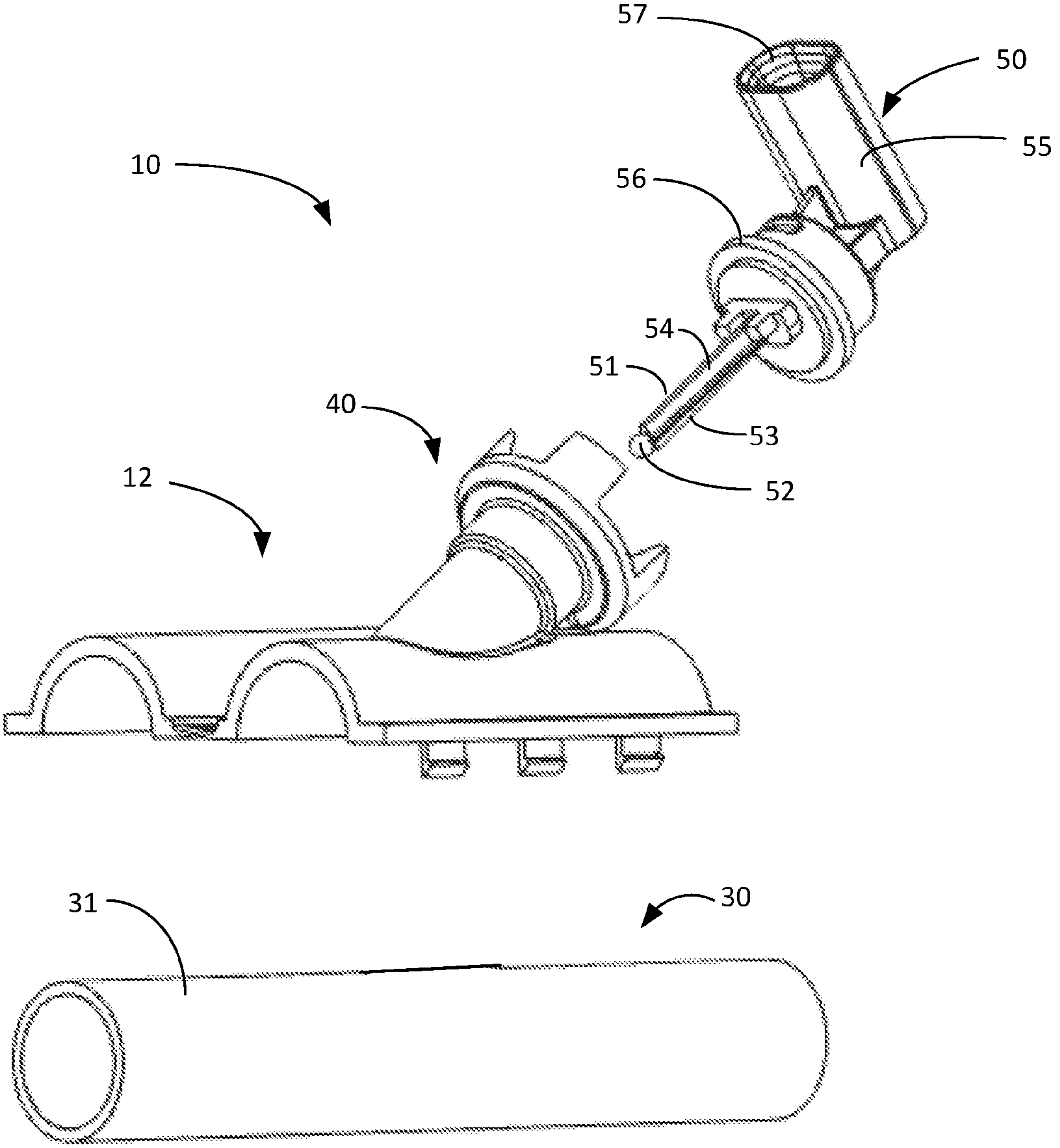
FIG. 1 is an exploded isometric view of the non-invasive temperature measuring device with which embodiments of the present disclosure are particularly applicable.

FIG. 1 is an exploded isometric view of a non-invasive temperature measuring device with which embodiments of the present disclosure are particularly applicable. As illustrated, the non-invasive temperature measuring device 10 generally includes a clamping body 12, shown in an open position and a temperature probe 50. The temperature probe 50 is received within a probe receptacle 40 extending from one of the body portions of clamping body 12. The clamping body 12 is configured to clamp around a wall 31 of a tube or pipeline 30. In an embodiment of the present invention the tube or pipeline is composed of a flexible polyethylene material, or from a thermoplastic polymer such as Polytetrafluoroethylene (PTFE). The clamping body 12 and probe receptacle 40 are molded as an integrated unit and made from of a rigid polymeric material such as a polyamide material, or a polyoxymethylene material, or other similar thermoplastic material having a stiffness necessary to retain the shape of the clamping body 12 when the clamping body is clamped around wall 31 of pipeline 30.

Figure 2:
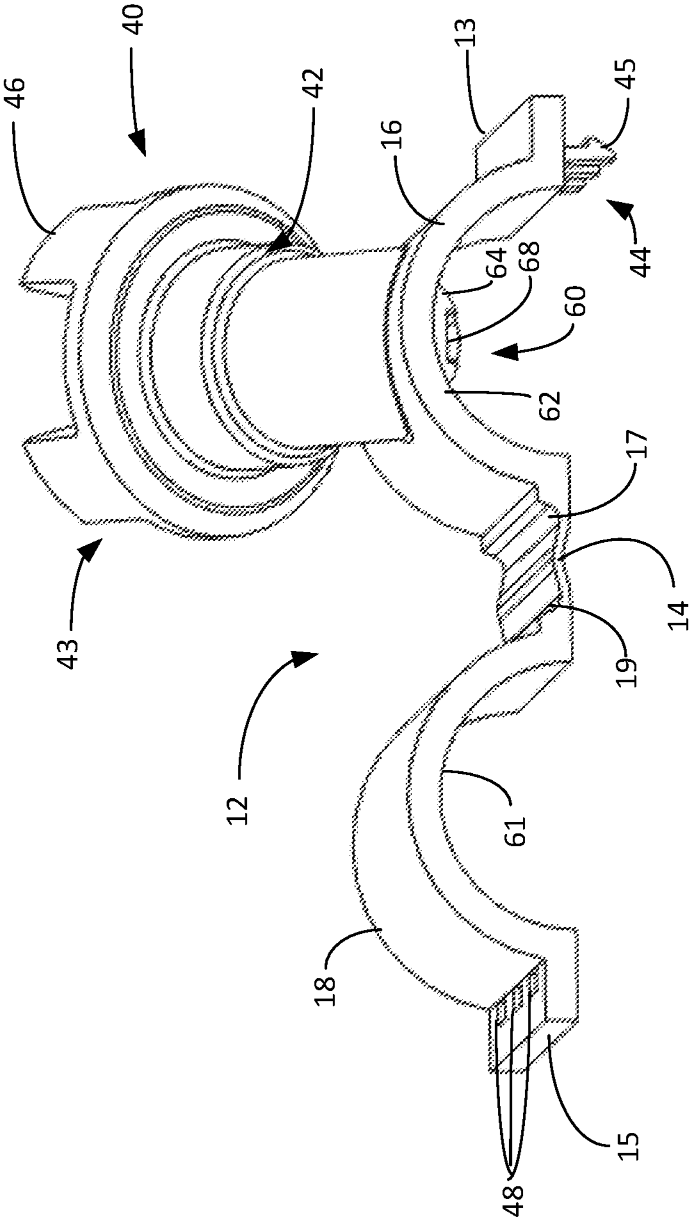
FIG. 2 is an isometric view of the clamping body in an open position from a first direction.
Figure 3:
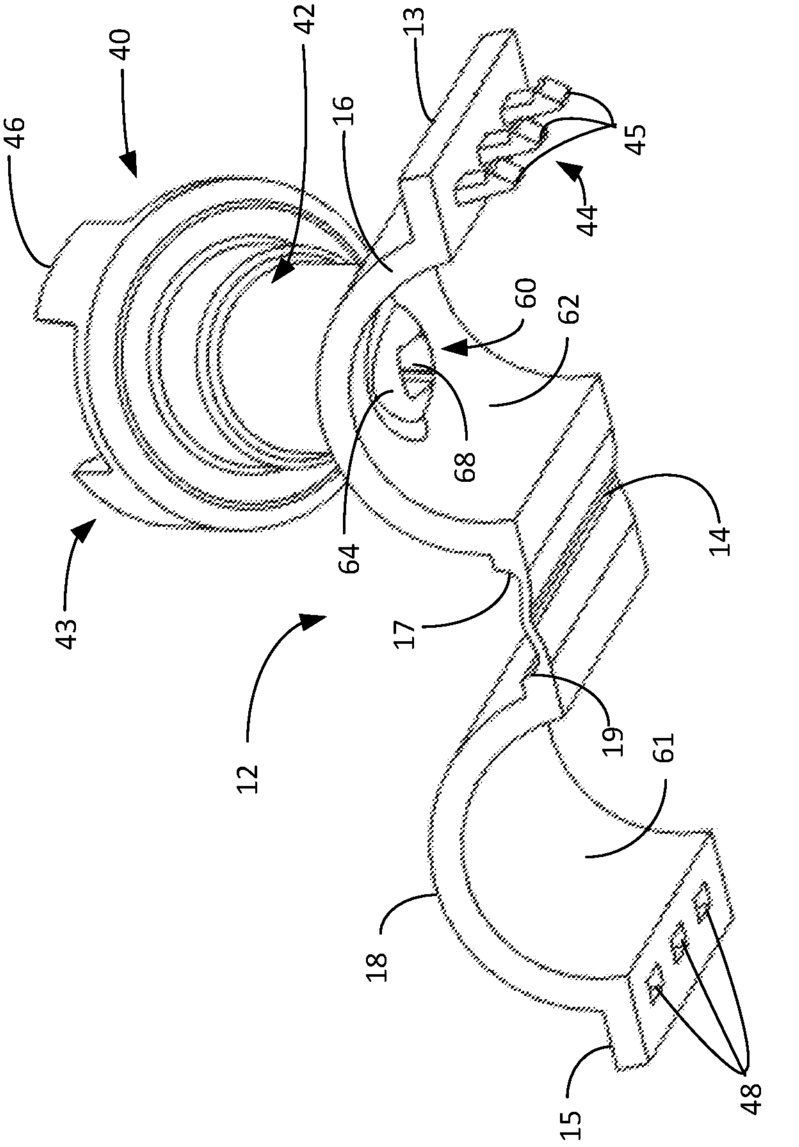
FIG. 3 is an isometric view of the clamping body shown in FIG. 2 from a second direction.

With reference to FIGS. 2-3 as well as FIG. 1 an embodiment of the clamping body 12 is illustrated in an as molded or open position. The clamping body 12 comprises a first body portion 16 which is rotatably connected to a second body portion 18. Each first and second body portions 16 and 18 include arcuate inner surfaces 61 and 62 respectively, that when installed on the pipeline 30 cradle the wall 31. A living hinge 14 flexibly connects the second body portion 18 to the first body portion 16. Living hinge 14 is integrally and homogeneously made of the material of the clamping body 12 and created during the molding of the first and second body portion 16 and 18. The material of living hinge 14 extends between an exterior surface 17 of the first body portion 16 to an exterior surface 19 of the second body portion 18.

The first body portion 16 further includes a planar shelf 13 that extends along a peripheral edge of the first body portion 16 on an opposing side from the living hinge 18. The shelf 13 includes a plurality of flexible latch arms 44. Each arm of the plurality of arms 44 having a first end attached to and extending from a bottom surface of the shelf 13 and a second end terminating in a tooth 45. A plurality of latch holes 48 extend through a planar shelf 15 located along a peripheral edge of the second body portion 18 on an opposing side from the living hinge 14. Each latch arm 44 and tooth 45 are sized and located to be received into a respective latch hole 48 when the second body portion 18 is rotated to engage the first body portion 16 and arranged to couple the second body portion 18 to the first body portion 16 when the clamping device 12 is clamped onto the pipeline 30.

The probe receptacle 40 extends from the first body portion 16. The probe receptacle 40 includes a stepped cylindrical receptacle body 42 extending from an exterior surface of the first body portion 16 on a first end to a generally cylindrical top hat portion 43 on a second end. The top hat portion 43 including a crenellated wall 46 extending about the periphery of the top hat 43. The probe receptacle 40 is integrally attached to the first clamping body 16 and molded from the same material comprising the clamping body 12. It should be noted that the present embodiment illustrates the probe receptacle 40 extending from the first body portion 16 at an acute angle of approximately 30 degrees to the longitudinal axis of the clamping body 12. The acute angle provides a space saving feature to the device 10. However, in other embodiments other various angular directions such as 90, 45 and 30 degrees to the longitudinal axis of the clamping body 12 may be used.

A protrusion 60 extends from a bottom surface 62 of the first body portion 16 below the probe receptacle 40. The protrusion 60 is generally elliptical in cross-section and includes an exterior wall 64 defining an interior cavity 66, The cavity 66 best seen at FIG. 6. An opening 68 extends through the exterior wall 64 from the cavity 66 to the exterior of the protrusion 60. The protrusion 60 is integrally molded to the first body portion 16 and made from the same polymeric thermoplastic material as the first body portion 16 of the clamping body 12.

A temperature measuring probe 50 includes a temperature sensing capsule 52 located at the tip of a probe shaft 54 that extends from a bottom portion of a probe body 56. Electrical leads 51 and 53 are electrically connected to the temperature sensing capsule 52 and extend along the probe shaft 54, through the probe body 56 to a connector portion 55 extending from a top surface of the probe body 56. Electrical leads 51 and 53 connect to electrical terminals housed within a connector cavity 57 of the connector portion 55. The connector cavity 57 is arranged to accept a suitable terminal connector (not shown) through the connector opening 57 and to electrically connect the temperature sensing capsule 52 to an external electrical circuit. The electrical leads 51 and 53 form a circuit for transmitting current changes representing the temperature sensed by temperature sensing capsule 52 to the terminals in the connector opening 57. The circuit formed by electrical leads 51 and 53 transmit the current changes as an output signal to the external electrical circuit through the terminal connector connected to the electrical terminals in the connector cavity 57.

Figure 4:
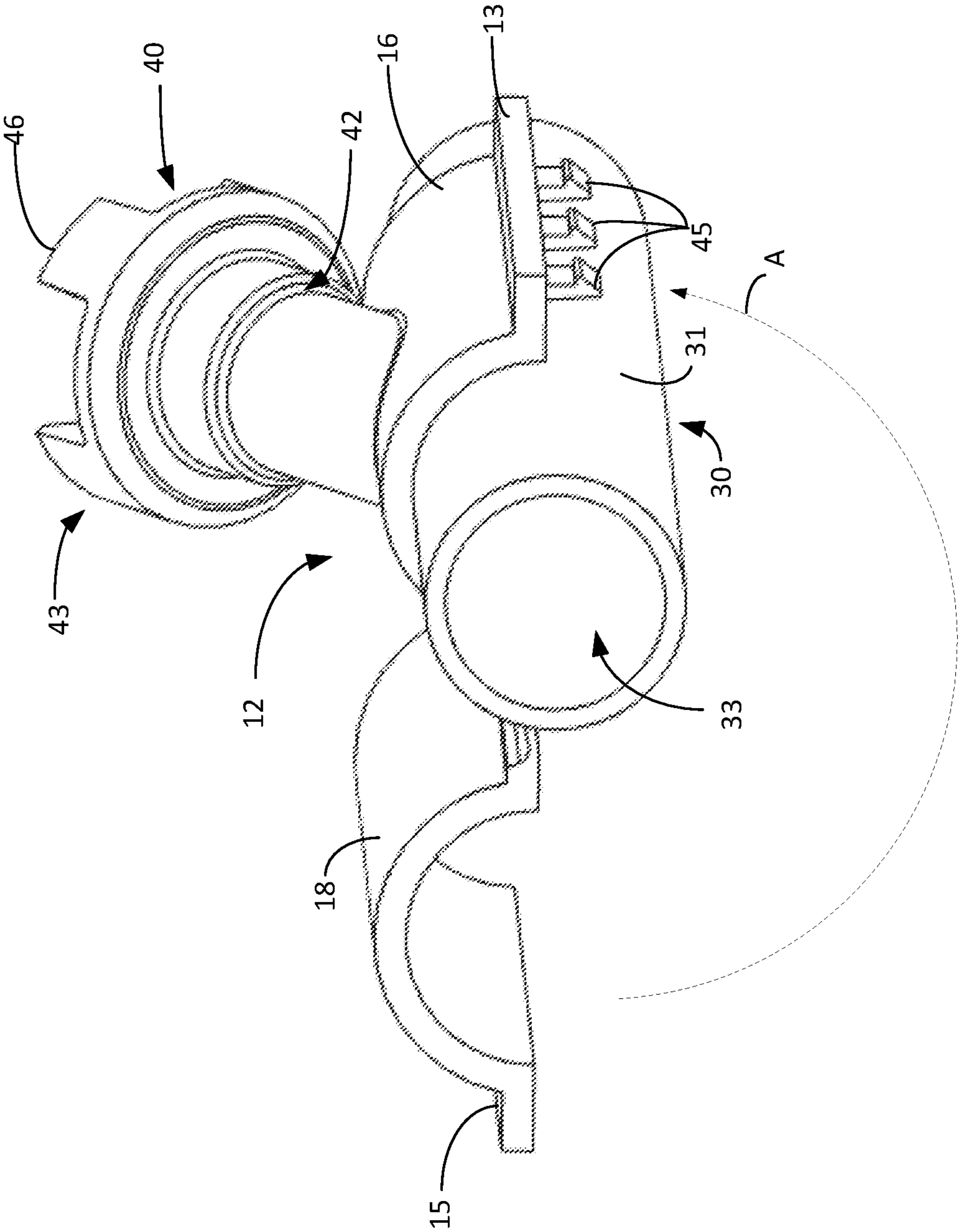
FIG. 4 is an isometric view of the clamping body in the open position installed on a pipeline before rotation of the clamping body into an engaged position.

FIG. 4, illustrates the installation of the clamping body 12 on the pipeline 30. A section of the wall 31 of a pipeline 30 where the clamping body 12 is to be installed is first warmed with a heating device (not shown), such as a heat gun, that softens the section of wall 31. Next the first body portion 16 of the clamping body 12 in the open position is placed on the wall 31 of pipeline 30 at the section of wall 31 where the heat was applied. The second body portion 18 is then rotated toward the first body portion 16 in an axis of rotation shown by line A. The axis of rotation A is defined by a closing arc of the living hinge 14. During this portion of rotation of the second body portion 18, the living hinge 14 and provides the only physical connection between the second body portion 18 and first body portion 16. The freely deflectable material of living hinge 14 provides an elastic biasing force that acts to align and bring shelf 15 of the second body portion 18 in alignment with shelf 13 of the first body portion 16. When shelf 15 aligns to shelf 13 each latching arm 44 and its associated tooth 45 is deflected and accepted within a corresponding latching hole 48. The second body portion 18 is coupled to the first body portion 16 when each tooth 45 is accepted through each latching hole 48 with each latching arm 44 returning to its non-deflected position that engages each tooth 45 to a top surface of shelf 15 that retains the first and second body portions 16 and 18 together and placing the clamping body 12 into an engaged position illustrated in FIG. 5.

Figure 5:
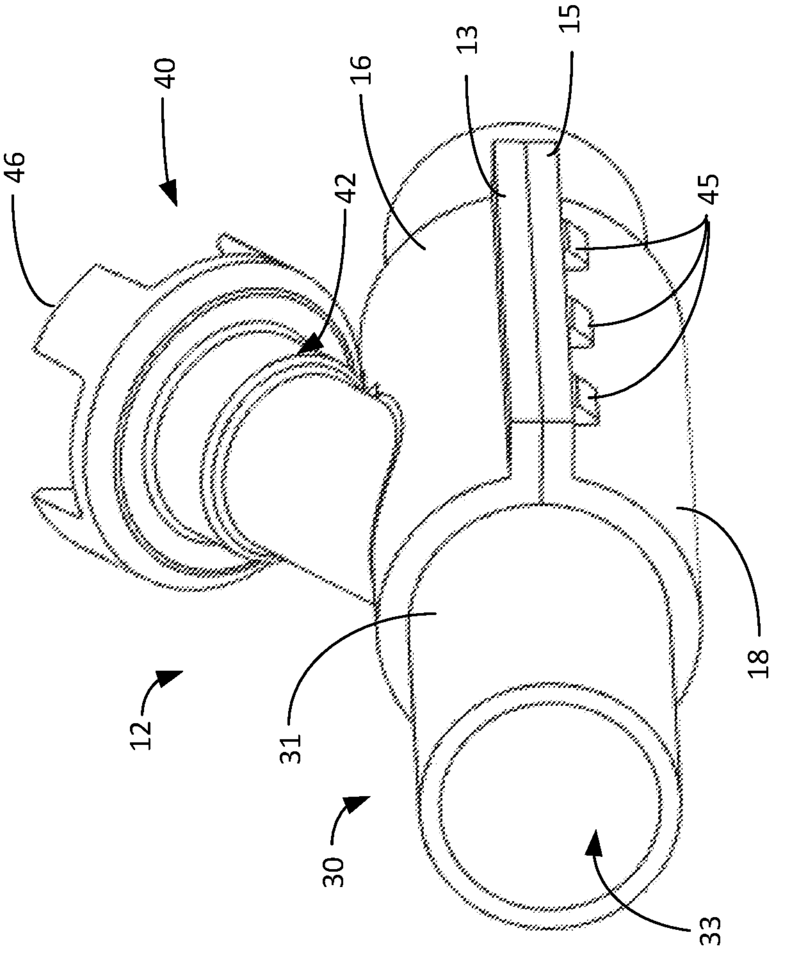
FIG. 5 is an isometric view of the clamping body installed on a pipeline in an engaged position.
Figure 6:
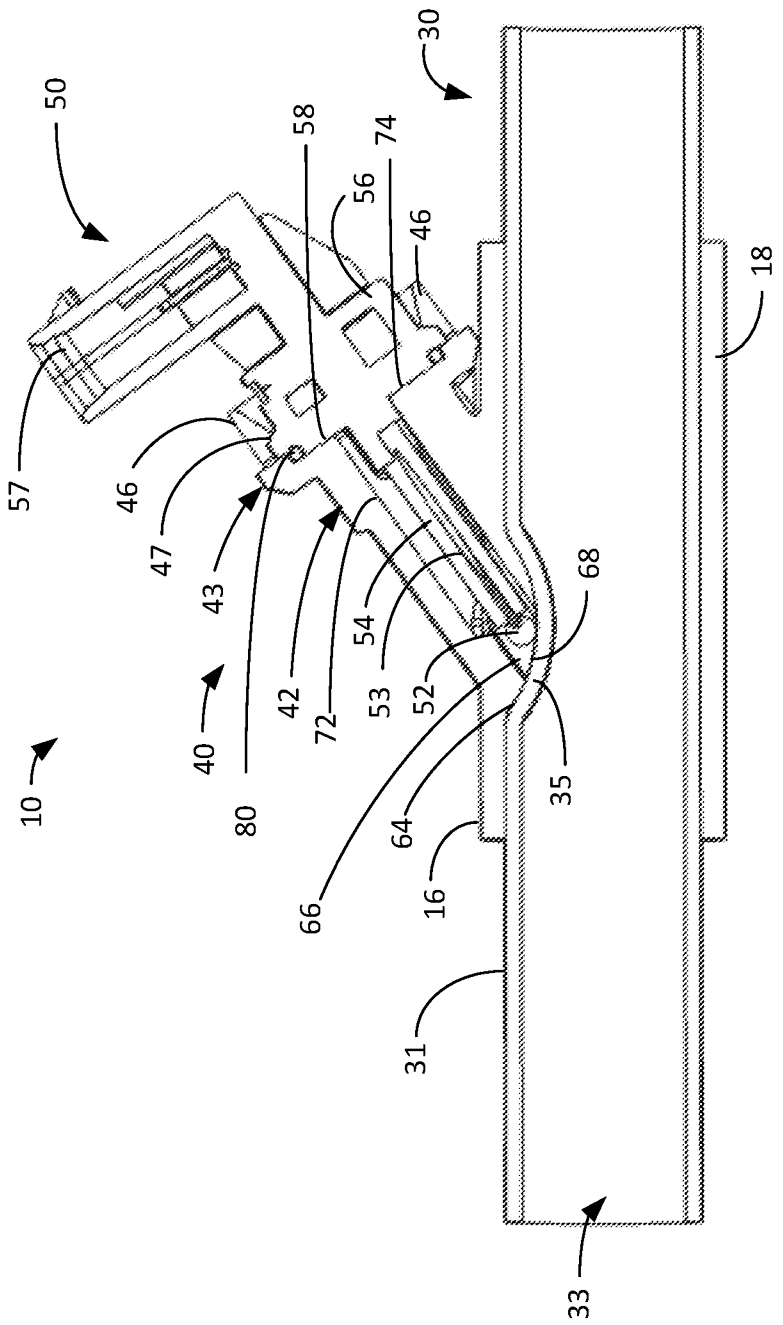
FIG. 6 is a longitudinal sectional view through the temperature measuring device installed on a pipeline.
Figure 7:
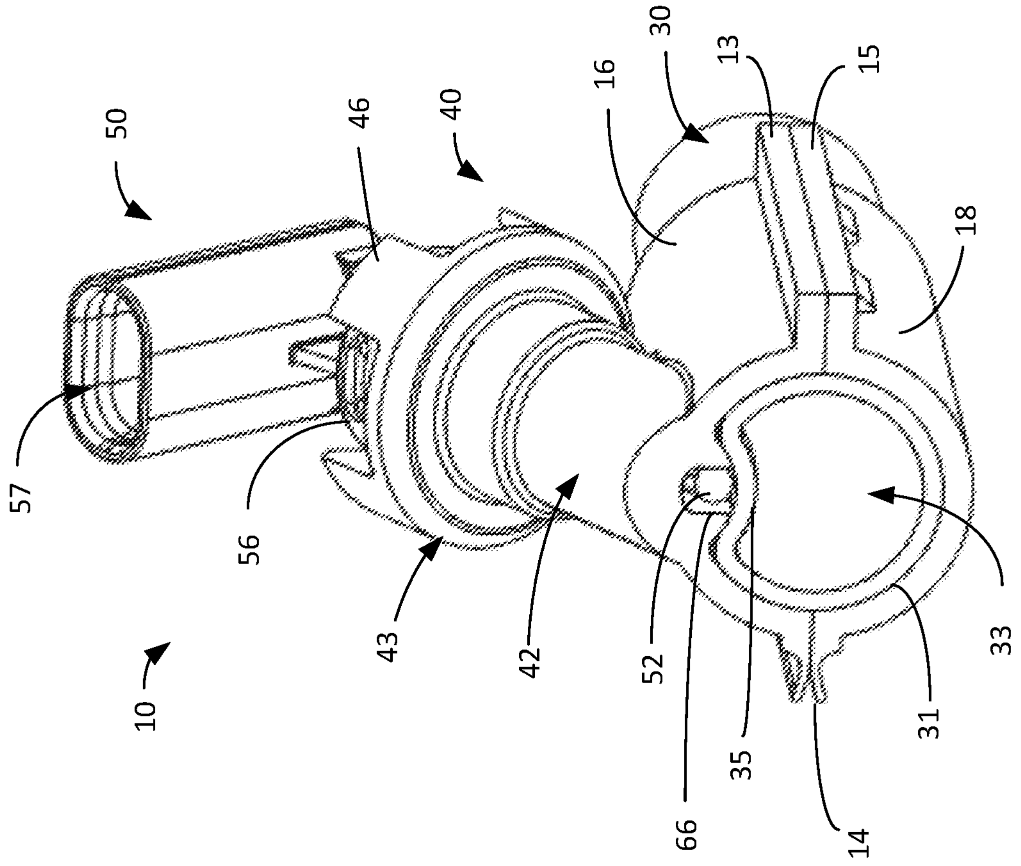
FIG. 7 is an isometric transverse sectional view through the temperature measuring device installed on pipeline.

FIGS. 6 and 7 illustrate sections through the clamping body 12 installed on pipeline 30 with the clamping body 12 in the engaged or closed position shown in FIG. 5. FIG. 6 and FIG. 7 each also illustrate the installed temperature measuring probe 50 within the probe receptacle 40. During the coupling of the second body portion 18 to the first body portion 16 the protrusion 60 engages a portion of the top surface 31 of the pipeline at the section where wall 31 was heated and softened by the heat gun. The clamping of the second body portion 18 to the first body portion 16 causes a force that drives the protrusion 60 into the softened section of wall 31 and causes a depression 35 to be formed on the wall 31. The depression 35 dilates the wall 31 into fluid passage 33 and into the fluid flowing in the fluid passage. The protrusion 60 wall 64 and opening 68 are intended to rest on wall 31 in depression 35, however, due to manufacturing inaccuracies the protrusion wall 64 may not rest entirely on wall 31 of depression 35 and may have a minor gaps between walls 31 and 64. The protrusion 60 does not break through wall 31 of depression 35 and therefore does not subject the protrusion 60 to the fluid flowing in fluid passage 33. Additionally, the protrusion 60 located within the depression 35, aids in preventing the clamping body 12 from moving axially or laterally on the pipeline 30.

After the clamping body 12 is installed on the pipeline 30 and the protrusion 60 forms the depression 35 in wall 31, the temperature measuring probe 50 is installed into the probe receptacle 40. The probe receptacle 40 includes an internal annular cavity 72 that extends from a top surface 74 of the top hat 43 through the receptacle body 42 to the chamber 66 located at a distal end of the receptacle body 42, defined by the protrusion 60. The probe shaft 54 with the electrical leads 51 and 53 (only 53 is shown) are placed in the cavity 72 with sensing capsule 52 positioned in chamber 66 resting on the wall 31 of depression 35 through opening 68. A floor

58 on the probe body 56 rests on top surface 74 of the top hat 43. The floor 58 includes a recess along its periphery that accepts an elastomeric sealing device 80 therein, such as for example an O-ring. The sealing device 80 is used to seal and protect the sensor capsule 52 from dust, dirt or water that may be present in the location of the installation of the device 10. The crenellated walls 46 extending from the top hat 43 include hooks 47 that engage via a snap-fit engagement external surfaces of probe body 56. The hooks 47 capture and retain the temperature measuring probe 50 to the probe receptacle 40. To aid in sensing and measuring the temperature of wall 31 and by inference the temperature of the fluid flowing in fluid passage 33, a heat transfer paste may be applied into the chamber 66 before installing the temperature measuring probe 50 into probe receptacle 40. The heat transfer paste aids in the transfer of heat from wall 31 to the temperature sensing capsule 52.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for measuring the temperature of a fluid contained in a passage enclosed by a wall, comprising:

a clamping body configured to attach to the wall;

a protrusion arranged on the clamping body to cause a depression in the wall that dilates the wall and locates the protrusion in the dilated wall and within the passage, wherein the dilated wall is exposed to the temperature of the fluid; and a sensor capsule housed in the protrusion that measures the temperature of the dilated wall as the temperature of the fluid.

2. The apparatus of claim 1, wherein the passage is enclosed by the wall of a pipeline, the clamping body further including:

a first body portion having a first arcuate inner surface;

a second body portion having a second arcuate inner surface; and a hinge allowing the first and the second body portions and first and second inner surfaces to rotate with respect to the other.

3. The apparatus of claim 2, wherein the first body portion, the second body portion, and the hinge are created from a resilient material, wherein the hinge is integrally attached to the first and second body portions.

4. The apparatus of claim 2, wherein the first body portion includes a first shelf located on a side opposite to the hinge, the first shelf including a plurality of flexible latch arms extending from a surface of the first shelf.

5. The apparatus of claim 4, wherein the second body portion includes a second shelf located on a side opposite to the hinge, the second shelf including a plurality of latch holes extending through the second shelf, wherein the second body portion is configured to be rotated to align each of the plurality of latch holes to the each of the plurality of latch arms.

6. The apparatus of claim 5, wherein each latch arm includes a tooth and each tooth moves its associated latch arm into a deflected position when the tooth is accepted within a respective latch hole, each latch arm resuming its un-deflected position when its associated tooth travels beyond the latch hole causing each tooth to grasp a surface of the second shelf to engage the first body portion to the second body portion thereby clamping the first arcuate inner surface and the second arcuate inner surface to the wall of the pipeline.

7. The apparatus of claim 6, wherein the protrusion is elliptically shaped and includes an exterior wall that extends from the first arcuate inner surface of the first body portion.

8. The apparatus of claim 7, wherein a section of the wall of the pipeline is subjected to heat to soften the wall.

9. The apparatus of claim 8, wherein the protrusion exterior wall causes the depression in the wall of the pipeline that dilates the wall and locates the protrusion within the passage when the first body portion is engaged to the second body portion.

10. The apparatus of claim 9, wherein the first body portion includes a probe receptacle that extends from the first body portion opposite from the first arcuate inner surface, the probe receptacle including a cavity extending in the interior of the probe receptacle from a top hat portion to a chamber formed in the protrusion, wherein the sensor capsule is located in the chamber.

11. The apparatus of claim 10, wherein a temperature measuring probe is arranged to be installed in the probe receptacle, the temperature measuring probe including:

first and second electrical conductors extending through the probe receptacle cavity from a body portion retained in the top hat to the sensor capsule located in the chamber; and a connector portion extending from the first body portion arranged to electrically connect the first and second electrical conductors and the sensor capsule to an external electrical circuit.

12. The apparatus of claim 11, wherein the protrusion includes an opening extending into the chamber and the sensor capsule rests on or near the surface of the dilated wall and wherein the chamber is filled with a heat transfer paste.

13. A method for assembling an apparatus that measures the temperature of a fluid contained in a passage enclosed by a wall, the method comprising:

engaging a clamping body to the wall;

causing a depression in the wall using a protrusion attached to the clamping body that dilates the wall and locates the protrusion in the dilated wall within the passage, wherein the diluted wall is exposed to the temperature of the fluid; and installing a sensor capsule in the protrusion that measures the temperature of the dilated wall as the temperature of the fluid.

14. The method of claim 13, wherein the step of engaging a clamping body to the wall includes:

providing a first body portion having a first arcuate inner surface;

providing a second body portion having a second arcuate inner surface; and connecting the first body portion having the first arcuate surface and the second body portion having the second arcuate surface to rotate with respect to the other using an integrated hinge.

15. The method of claim 14, wherein the method includes:

providing a first shelf on the first body portion on a side opposite to the hinge, the first shelf including a plurality of flexible latch arms extending from a surface of the first shelf;

providing a second shelf on the second body portion on a side opposite to the hinge, the second shelf including a plurality of latch holes extending through the second shelf; and rotating the second body portion to align each of the plurality of latch holes to each of the plurality of latch arms.

16. The method of claim 15, wherein each latch arm of the plurality of latch arms includes a tooth, the method further including:

moving each latch arm into a deflected position by its associated tooth when the tooth is accepted within a respective latch hole; and returning each latch arm to its un-deflected position when its associated tooth travels beyond the latching hole causing each tooth to grasp a surface of the second shelf and engage the first body portion to the second body portion thereby clamping the first inner surface and the second inner surface to the wall of the pipeline.

17. The method of claim 16, wherein the protrusion includes an exterior wall that extends from the first arcuate inner surface of the first body portion, the method including:

applying heat to a section of the wall of the pipeline adjacent the protrusion; and causing the protrusion exterior wall to form a depression in the wall of the pipeline that dilates the wall and locates the protrusion within the pipeline passage when the first body portion is engaged to the second body portion.

18. The method of claim 17, wherein the first body portion includes a probe receptacle extending from a top hat to a chamber formed in the protrusion, the method further including:

installing a temperature measuring probe in the probe receptacle, the temperature measuring probe including:

first and second electrical conductors extending through the probe receptacle from a body portion retained on the top hat to the sensor capsule located in the chamber; and a connector portion extending from the first body portion and from the top-hat arranged to electrically connect the first and second electrical conductors and the sensor capsule to an external electrical circuit.

19. The method of claim 18, wherein the protrusion includes an opening extending into the chamber and the sensor capsule rests on or near the surface of the dilated wall and wherein the chamber is filled with a heat transfer paste.

20. A non-invasive temperature measuring device for measuring the temperature of a fluid in a pipeline passage enclosed by a wall, comprising:

a clamping body having a probe receptacle extending from a first portion of the clamping body;

a temperature measuring probe installed in the probe receptacle, the temperature measuring probe including a sensor capsule located in a protrusion, the protrusion extending from the first portion of the clamping body; and a clamping body second portion rotatably mounted to the first portion, wherein the first portion of the clamping body is installed on a wall section of the pipeline after the wall section has been heated and the second portion of the clamping body is rotated to engage the first portion and drive the protrusion to contact the heated wall section and cause the wall section to dilate and locate the protrusion and the dilated wall section in the pipeline passage, wherein the diluted wall is exposed to the temperature of the fluid and the sensor capsule measures the temperature of the dilated wall as the temperature of the fluid.

* * * * *